UNITED STATES PATENT OFFICE.

WILLIAM H. BOWKER AND THOMAS L. STURTEVANT, OF BOSTON, MASS.

IMPROVEMENT IN PREPARED FOOD FOR ANIMALS.

Specification forming part of Letters Patent No. 195,479, dated September 25, 1877; application filed June 14, 1877.

*To all whom it may concern:*

Be it known that we, WILLIAM H. BOWKER and THOMAS L. STURTEVANT, of Boston, Suffolk county, Massachusetts, have invented an Improved Animal Meal for Fowls, of which the following is a specification:

This invention relates to food for poultry, pigs, or other animals, in which animal matter of one or more varieties is combined with bone as a substitute for scraps, fresh meat, &c.

Our invention consists in combining, with such food, carbon in the form of charcoal and parched corn or other baked, parched, or roasted grains or nitrogenous vegetable matter in equal or varying proportions.

To improve the preserving qualities of the food, and to diminish the ammoniacal and other odors which escape from it, we employ charcoal made from wood, or carbonized grain, (corn, wheat, rye, &c.,) to be effective. This charcoal not only absorbs the gases escaping from the compound, but prevents it from heating and throwing off these gases of decomposition. The charcoal also constitutes a healthy and useful ingredient of the food, it aiding and promoting digestion.

In carbonizing the grain a portion of it, if corn, may or should be parched or "popped," as it is termed, as this is one of the best substances known to stimulate egg production in fowls.

Dried blood may be used with or in place of dried meat.

We claim—

A compound composed of dried blood or meat, charcoal, carbonized, roasted, or parched grain, and ground bone, in equal or varying proportions, substantially as and for purposes stated.

WILLIAM HENRY BOWKER.
THOMAS LEGGETT STURTEVANT.

Witnesses:
JOHN J. BRADISH,
B. MOODY,
W. E. BOARDMAN.